US006230076B1

(12) United States Patent
Miller

(10) Patent No.: US 6,230,076 B1
(45) Date of Patent: May 8, 2001

(54) METHOD AND APPARATUS FOR THE AUTOMATION OF AN ENVELOPE OPENING STATION

(75) Inventor: John Miller, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/408,253

(22) Filed: Sep. 29, 1999

(51) Int. Cl.$^7$ .............................. G06F 7/00; B65B 43/26

(52) U.S. Cl. .......................... 700/220; 700/221; 53/381.6

(58) Field of Search .................................... 700/220, 221; 53/381.5, 381.6, 492

(56) References Cited

U.S. PATENT DOCUMENTS 4,418,515 12/1983 Foster et al. .......................... 53/457
4,835,941 * 6/1989 Torii et al. ...................... 53/381.6 X
5,067,305 11/1991 Baker et al. .......................... 53/411
5,125,214 * 6/1992 Orsinger et al. ............... 53/381.6 X
5,152,122 10/1992 DeBarber et al. ..................... 53/460
5,467,577 * 11/1995 Sato .................................. 53/468 X
5,618,375 * 4/1997 Suzuki et al. ................... 53/381.5 X
5,725,720 3/1998 Micaletti et al. .................... 156/364
5,975,514 * 11/1999 Emigh ............................ 53/381.6 X

* cited by examiner

*Primary Examiner*—Christopher P. Ellis
*Assistant Examiner*—Gene O. Crawford
(74) *Attorney, Agent, or Firm*—Steven J. Shapiro; Michael E. Melton

(57) ABSTRACT

A method and apparatus for the automation of an envelope opening station wherein a plurality of suction cups are placed over the throat section of an envelope to lift the throat in order to spread open the envelope. The method and the apparatus use an electronic imaging device to acquire the image of the envelope including the width and the throat section thereof. An electronic processor is used to determine the width and the throat profile of the envelope from the acquired image and compute the preferred locations for placing the suction cups on the envelope. A positioning device is used to adjust the location of the suction cups in accordance with the preferred locations.

17 Claims, 5 Drawing Sheets

METHOD AND APPARATUS FOR THE AUTOMATION OF AN ENVELOPE OPENING STATION

TECHNICAL FIELD

The present invention relates generally to an envelope opening device and, more specifically, an envelope opening device in an insertion station for mass mailing.

BACKGROUND OF THE INVENTION

In an insertion machine for mass mailing, there is a gathering section where enclosure material is gathered before it is inserted into an envelope. This gathering section is sometimes referred to as a chassis subsystem, which includes a gathering transport with pusher fingers rigidly attached to a conveyor belt and a plurality of enclosure feeders mounted above the chassis. If the enclosure material contains many documents, these documents must be separately fed from different enclosure feeders. After all the released documents are gathered, they are put into a stack to be inserted into an envelope in an insertion station. Envelopes are separately fed to the insertion station, one at a time, and each envelope is placed on a platform with the front face of the envelope facing down and its flap flipped back all the way. At the same time, mechanical fingers or a vacuum suction device is used to keep the envelope on the platform while the throat of the envelope is pulled upward to spread open the envelope. The stack of enclosure material is than automatically inserted into the opened envelope.

Before the envelope is spread open, a number of suction cups or other lifting devices must be properly positioned at the throat section of the envelope. The position of suction cups, relative to each other, must be adjusted in accordance with the size and the type of the envelope. In an open structured insertion machine, operators are able to observe the opening device as it functions and make manual adjustments at the location of the opening mechanism to improve the performance. But for certain insertion machines, the insertion process is behind doors and/or out of visual range such that routine manual adjustments become very difficult and impractical.

It is advantageous to provide a method and device for adjusting the envelope opening device based on the type of envelope and without human intervention.

SUMMARY OF THE INVENTION

The present invention provides a method and an apparatus for the automation of an envelope opening station, wherein a plurality of suctions cups are placed over the throat section of an envelope in order to lift the throat section. The apparatus includes: an electronic imaging device that acquires an image of the envelope; an electronic processor for receiving and processing the image acquired by the imaging device in order to determine the width and the throat profile of the envelope, wherein the electronic processor computes preferred locations for placing each of the plurality of suction cups on the envelope in accordance with the width and the throat profile of the envelope; and a positioning device for moving the plurality of suction cups to the preferred locations on the envelope based upon data indicative of the preferred locations received from the electronic processor.

Accordingly, the method for the automation of an envelope opening station, includes the steps of: 1) acquiring an image of an envelope with an imaging device; 2) conveying the acquired image to an electronic processor; 3) determining by the processor the width and the throat profile of the envelope using the acquired image; 4) computing the preferred locations for placing each of a plurality of suction cups on the envelope in accordance with the width and the profile of the envelope; and 5) placing the suction cups at a plurality of locations on the envelope based on data indicative of the preferred locations as computed in step 4.

The method and apparatus, according to the present invention, will become apparent upon reading the following description taken in conjunction with FIG. 1 to FIG. 5.

DETAILED DESCRIPTION

Figure 1:
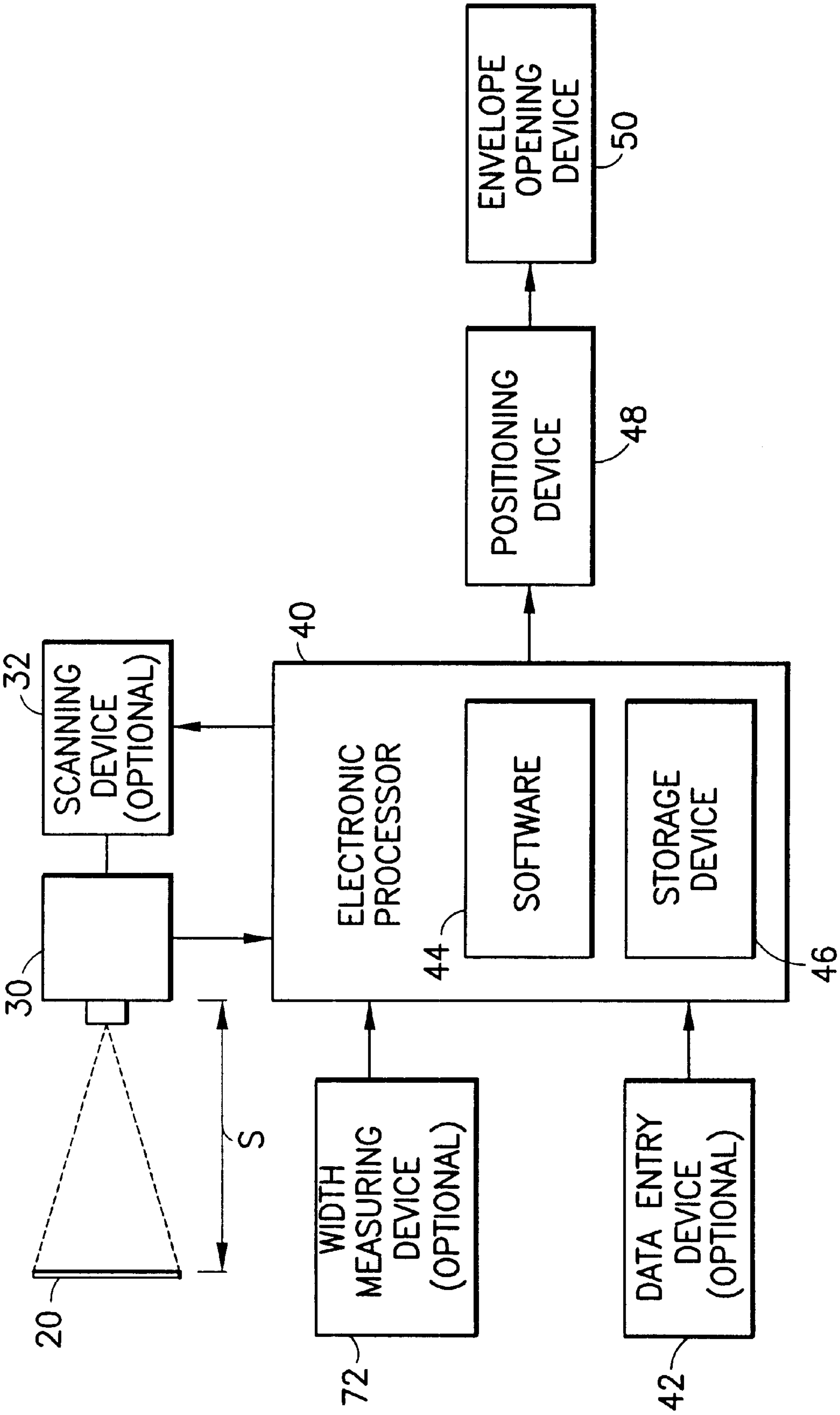
FIG. 1 illustrates a block diagram of the automation apparatus.
Figure 2:
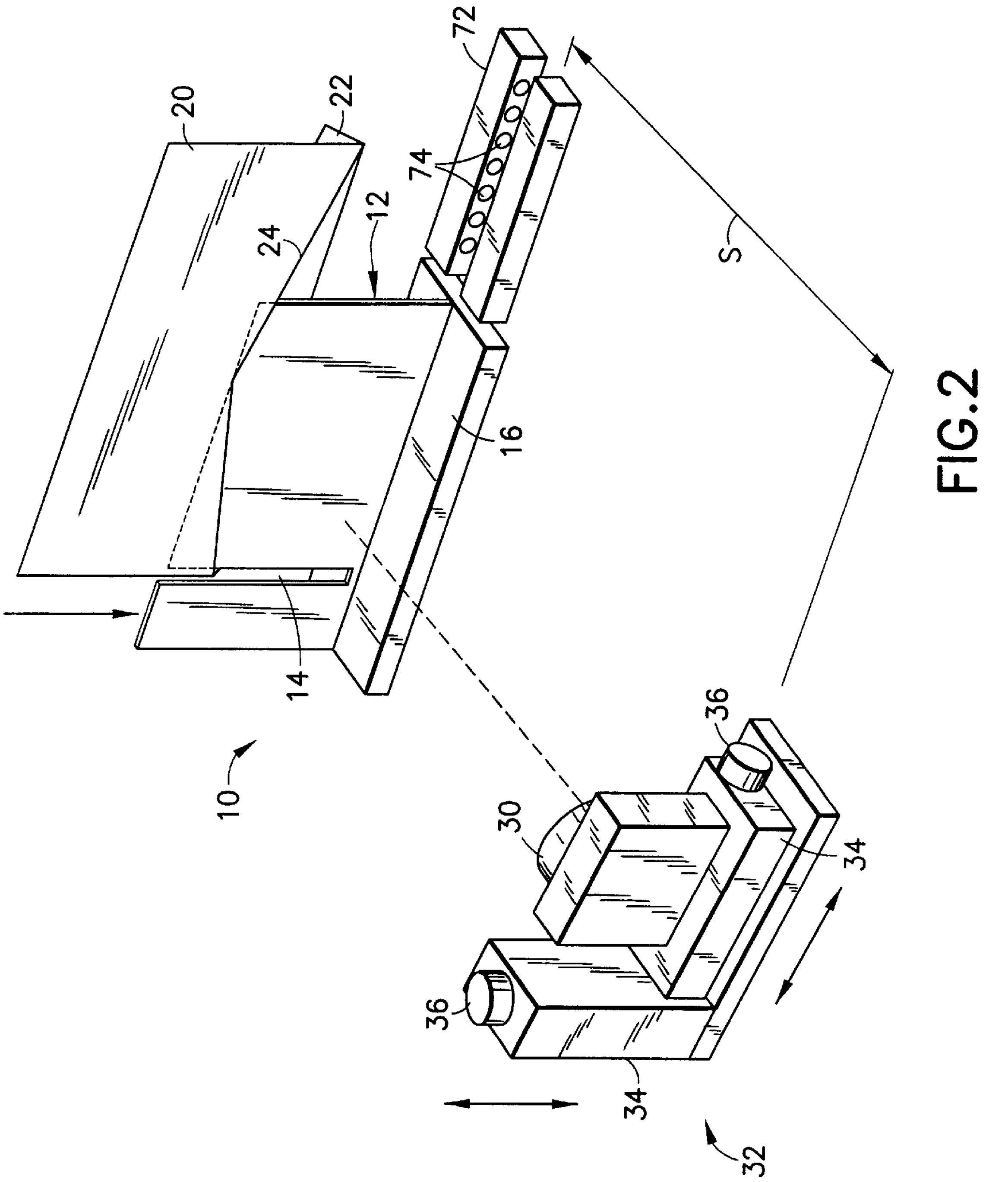
FIG. 2 illustrates an envelope supporting surface and an imaging device.

FIG. 1 illustrates a block diagram of the automation apparatus. In FIG. 1, there is shown an envelope 20, and an electronic imaging device 30 for acquiring the image of the envelope 20. The envelope 20 is placed at the image plane of the imaging device 30. The image plane, being measured from the imaging device 30 to the envelope 20, is represented by the distance S. It is understood that the envelope 20 is placed in such a way that the throat section can be clearly seen by the imaging device 30, as shown in FIG. 2. The acquired image is conveyed to an electronic processor 40 so that the width and the throat profile of the envelope 20 can be determined. It is preferred that the field of view of the imaging device 30 is sufficiently broad to cover the entire width of most commonly used envelopes. However, it is possible that the field of view just broad enough to cover half of the envelope width. For the latter case, it is necessary to measure the width of the envelope. The width can be measured manually and then entered to the electronic processor 40 via a data entry device 42. But it is also possible to measure the width of the envelope 20 by a measuring device 72, as shown in FIG. 2. The width measuring device 72 sends the width information to the electronic processor 40 for computing the width of the envelope 20. It is also possible that the field of view of the imaging device 30 only covers a section of the envelope. In that case, a scanning device 32 is used to move the imaging device 30 in a plane substantially parallel to the envelope 20 in order to acquire the envelope image.

Figure 4:
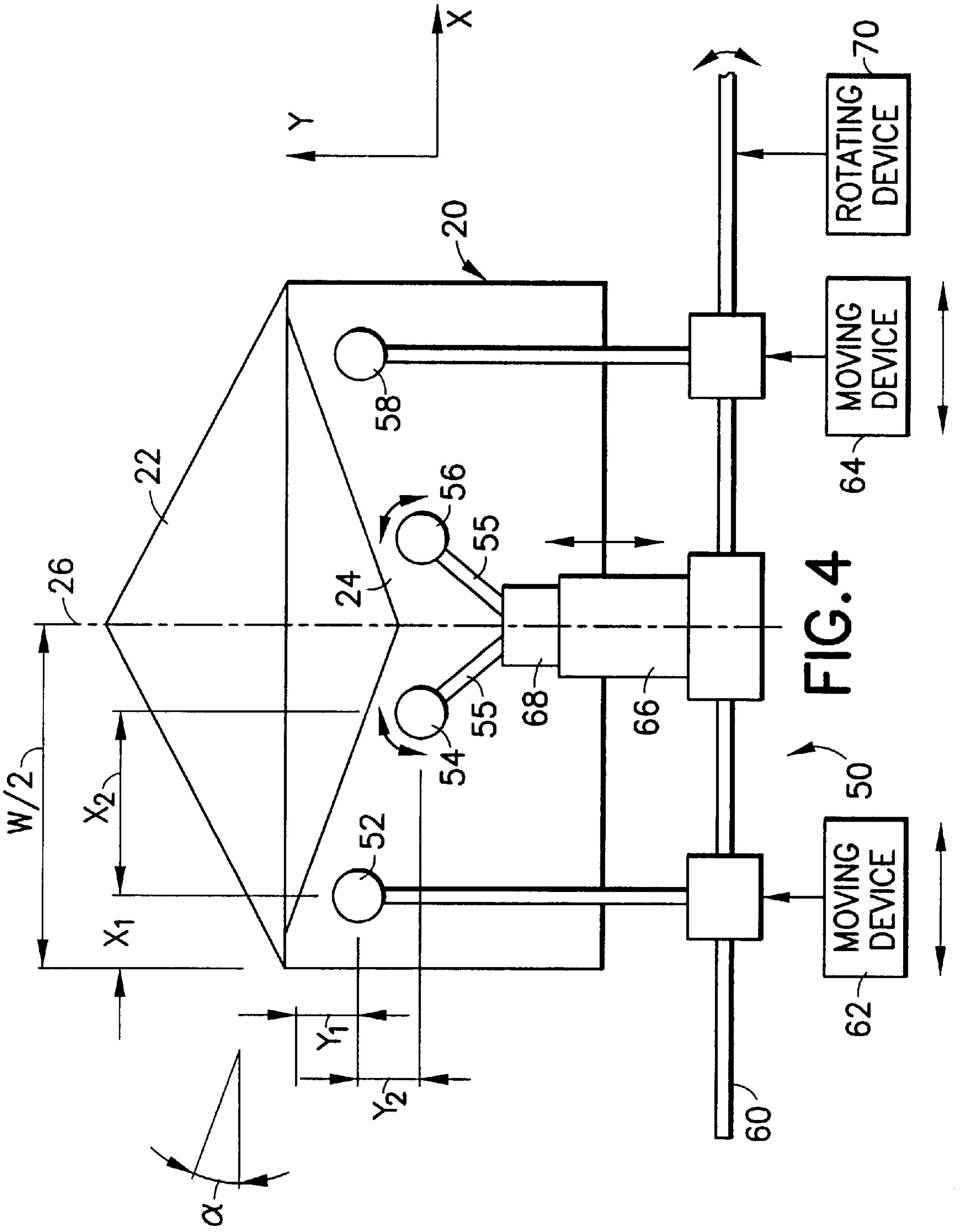
FIG. 4 illustrates the placement of suction cups over the throat section of an envelope.

It is well known that the actual size of an object can be measured by the size of its image through proper calibration of the imaging device 30. For example, an image of an object of a known size can be used for converting the pixel number on an image to the actual dimension, such as 25 pixels on the image being equal to 1 inch of the object dimension. It is also well known that image processing software including edge enhancement and edge detection algorithms can be used to measure the size of an object in a digital image. Thus, it is preferred that a computation/processing software 44 be used to determine the width and the throat profile of the envelope based on the image data received from the imaging device 30 and compute the preferred locations for placing a plurality of suction cups over the throat of the envelope 20. It is understood that software 44 includes necessary image processing routines, image measurement routines and computation algorithm. Regardless of the method and the apparatus used to provide envelope profile data to the processor 40, the computer software 44 ascertains the desired suction cup locations based on the provided envelope profile data and sends the cup location data to a positioning device 48 in order to adjust the suction cup locations in an envelope opening device 50 according to the throat profile of the envelope, as shown in FIG. 4.

Once an envelope is measured by the electronic processor, the information regarding the width and the throat profile can be used again. Thus, it is preferred that the width and throat profile of the envelope be stored in a data storage device 46. Moreover, it is possible to identify a certain envelope by a code number so that the envelope information can be called out by entering a code to the electronic processor 40 via the data entry device 42.

It should be noted that the description provided above is taken in conjunction with FIG. 1 as a general approach to the automatic placement of envelope opening devices based on the width and throat profile of an envelope. The most basic components required for the automation of an envelope opening station are: the imaging device 30, the processor 40, software 44 and the positioning device 48. In that respect, the width measuring device 72, the data entry device 42, and the scanning device 32 are optional. These devices are just one of the many alternative ways that can be used to adjust the suction cup locations based on the envelope width and throat profile. Therefore, the preferred embodiment of the apparatus for the automation of an envelope opening device, according to the present invention, comprises 1) an imaging device for acquiring an image of an envelope, 2) a processor with a computation/processing software for determining the width and throat profile of the envelope and for computing the preferred locations for placing each of a plurality of suction cups on the envelope based on the width and the throat profile of the envelope, and 3) a device for placing the suction cups on the envelope based on the computed preferred placement locations.

It should also be noted that the envelope opening device 50 in FIG. 1 may include a plurality of suction cups to be placed on the throat section of an envelope to lift the throat section, but it may include a different type of throat lifting device such as mechanical fingers.

FIG. 2 illustrates an exemplary arrangement for obtaining the image of an envelope. FIG. 2 shows an envelope supporting surface 10 to support an envelope 20 and an imaging device 30 for acquiring the image of the envelope 20. As shown, envelope supporting surface 10 includes a flat plate 12 to allow the envelope 20 to slide onto it. Preferably, the supporting surface 10 also includes a slot 14 to align the envelope edge. The envelope 29 is slid down completely into the slot 14 with flap 22 folded backward to expose the throat section 24. It is also preferred that the flat plate 12 has a light absorbing surface in order to increase the contrast between the flat plate 12 and the envelope 20 inserted thereon. It is preferred that plate 12 be small enough for a #6 envelope (3.5"×6") to slide over. For example, plate 12 can be 3"×5" (76 mm×127 mm). But plate 12 can have a different size, smaller or larger than 3.5"×6", depending on the application. It is also desirable to have a stand 16 to hold the plate 12 in an upright position.

It is preferred that the imaging device 30 be a digital camera using an image chip for image capture. It is also preferred that the field of view of the imaging device 30 be sufficiently broad so that it covers the entire width of the envelope 20. Because image quality is not very critical in this application, a large field of view can be easily accomplished by fitting a lens with sufficiently short focal length and a sufficiently small F/number onto the camera. It should be noted that the image device 30 can be of many different types. It can be a camera with one or more CCD chips, with a Vidicon tube or other imaging capturing medium. It can also be a camera with one or more 2D sensor arrays with strobe.

It is preferred that the field of view of the imaging device 30 be sufficiently broad so that it covers the entire width of the envelope 20. However, if the field of view of the imaging device 30 cannot cover the entire width but it can cover at least half the width of the envelope 20, it is possible to determine the profile of the entire throat 24 of the envelope 20 once the entire width of envelope 20 is known. The envelope width can be measured by a width measuring device 72. The measuring device can be an array of optical sensors 74 to detect the envelope edge that is placed in the device.

It is also possible that the field of view of the imaging device 30 covers only a section of the envelope 20. In that case, a scanning device 32 can be used to move the imaging device 30 to extend its field coverage. For example, it is possible to use one or two translation stages 34, each of which is driven by a motor 36, to move the imaging device 30 in a plane substantially parallel to flat plate 12. It should be noted that, as shown in FIG. 2, the envelope 20 is stationary while the imaging device 30 is transported across the image field, but it is also possible that the image device 30 remains stationary while the envelope 20 is transported.

Figure 3A:
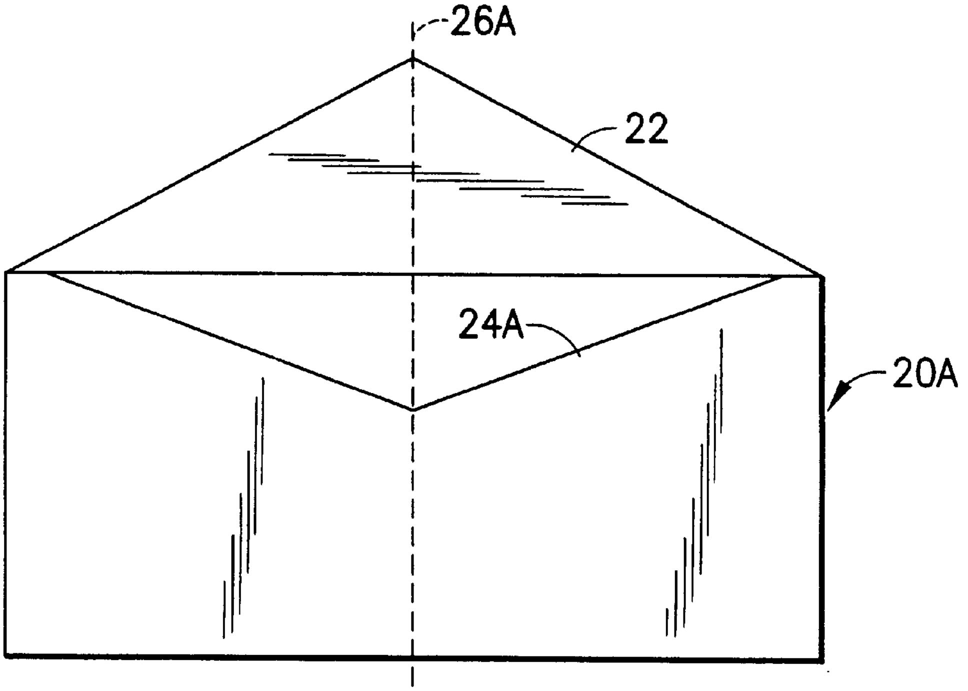
FIGS. 3A and 3B show envelopes with different throat profiles.
Figure 3B:
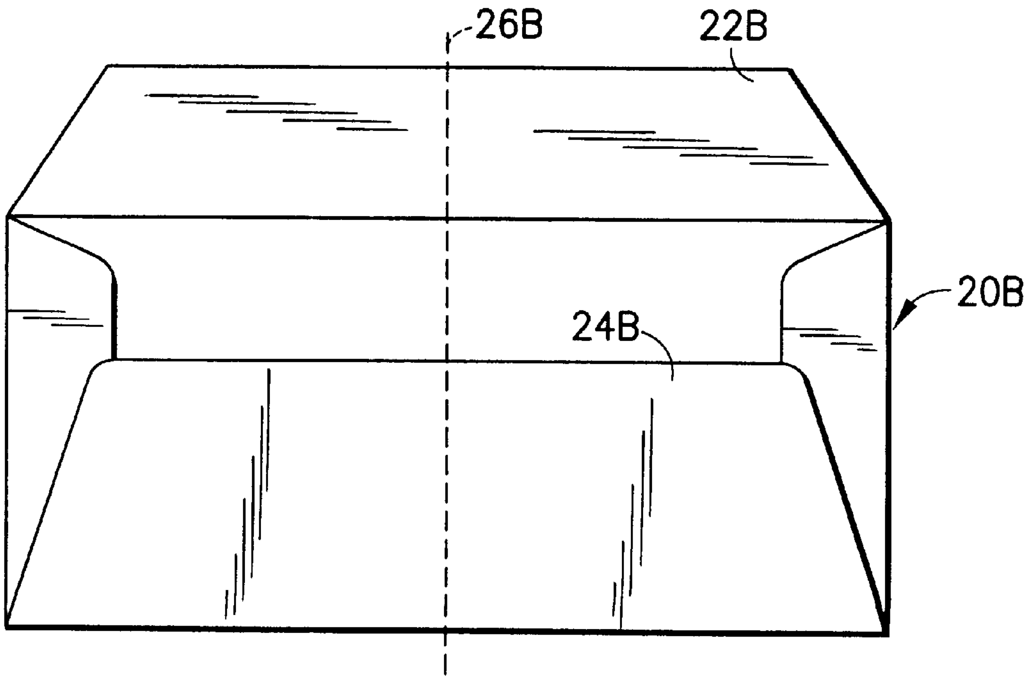

FIGS. 3A and 3B show envelopes with different throat shapes. In FIG. 3A, there is shown an envelope 20A having a pointed flap 22A and a V-shaped throat 24A. With this type of envelope, it is possible to locate the center line 26A of the envelope by detecting the abrupt change in the slope angle of the throat 24A. Thus, it is necessary to image only half of the envelope width in order to measure the width and the throat profile of the envelope 20A. In order to calculate the preferred suction cup locations, it is desirable to know the slope angle of half of the throat portion, as shown in FIG. 4.

In FIG. 3B, there is shown an envelope 20B having a flat flap 22B and a flat throat profile 24B. With this type of envelope, it is necessary to know the entire width of the envelope 20B in order to locate the center line 26B. With his type of envelope, the suction cups can be placed in a straight line below the throat 24B to spread open the envelope 20B.

FIG. 4 illustrates the placement of suction cups 52, 54, 56, 58 over the throat section 24 of envelope 20. The four suction cups 52, 54, 56, 58 are used to lift the throat section 24 of an envelope 20 in order to open the envelope 20. The throat section of an envelope is usually symmetrical about a center line 26 that dissects the envelope's width, W. Accordingly, it is preferred that the suction cups 52, 54, 56, 58 be placed such that the two center suction cups 54, 56 and the two outer suction cups 52, 58 are respectively "mirrored" about center line 26. It is also preferred that all the suction cups 52, 54, 56, 68 be mounted on a common shaft 60 so that they can be simultaneously lowered to seal with the throat section 24. For that purpose, a rotating device 70, such as a motor, or a motor with a cam, can be used to rotate the shaft 60.

In order to accommodate envelopes of different widths, moving devices 62, 64 such as motors together with gears, pulleys and belts can be used to move the two outer cups 52, 58 along the X direction. It is preferred that the outer cups 52, 58 be moved simultaneously but in opposite directions in order to maintain the symmetry about the center line 26. Furthermore, it is preferred that the two center cups 54, 56 be moved together along the Y direction in order to extend or shorten the distance between the center cups 54, 56 and the shaft 60 and that the two center cups 54, 56 be moved in opposite directions to adjust the distance therebetween. Preferably, the two center cups 54, 56 are mounted on two pivot arms 55 which are pivotably mounted on a rotating mechanism 68 so that they can be caused to sweep out an equal arc in opposite directions. Furthermore, the rotating mechanism 68 is movably mounted on a base 66 to allow movement along the Y direction. For example, racks and pinions and a motor can be installed on the base 66 to move the moving mechanism 68 in and out along the Y direction; and gears and motors can be installed on the moving mechanism 68 to drive pivot arms 55 in opposite directions in order to locate inner cups 54, 56.

In FIG. 4, $X_1$, denotes the distance between an envelope edge and the adjacent suction cup 52, while $Y_1$ denotes the distance between the throat edge and suction cup 52. It is preferred that $X_1$ and $Y_1$ range from 0.3" to 0.6" (76 mm to 152 mm), but these distances can be smaller or greater depending on the width and the throat profile of the envelope. $X_2$ and $Y_2$ denote the distance between outer cup 52 and the adjacent cup 54. If the suction cups are evenly spaced, then $$X_2=(W-2X_1)/3$$

$$Y_2/X_2=\tan\alpha$$

where α is the slope angle of the throat. The above two equations are only a quick rule-of-thumb used together with the envelope profile to determine the respective position of the four suction cups 52, 54, 56, 58 on the throat of an envelope. The suction cups 52, 54, 56, 68 can be placed differently on the envelope, if desired, by use of alternative equations.

Figure 5:
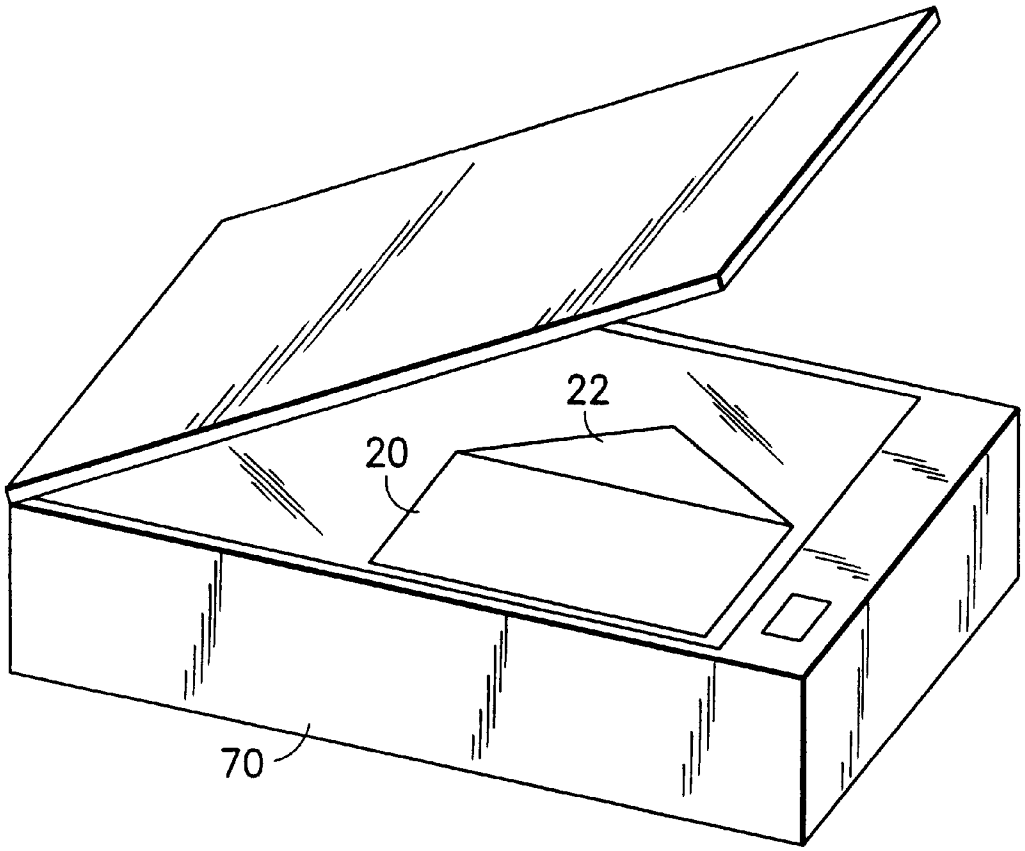
FIG. 5 illustrates an image scanner.

FIG. 5 illustrates an image scanner 70 being used as an electronic imaging device. As shown, the flat-bed scanner 70 is used to acquire the image of an envelope 20 with the flap 22 folded out to expose the throat section to the imaging elements of the scanner.

Although the invention has been described with respect to a preferred version and embodiment thereof, and the drawings are for illustrative purposes only, it will be understood by those skilled in the art that the foregoing and various other changes, omissions and deviations in the form and detail thereof may be made without departing from the spirit and scope of this invention.

What is claimed is:

1. In an envelope opening station for opening an envelope, wherein the envelope has a width, a throat section with a throat profile, and the opening station has a plurality of suction cups to be placed over the throat section of the envelope in order to lift the throat section, an apparatus for automatic adjustment of the location of the suction cups comprising:

1) an electronic imaging device that acquires an image of the envelope;

2) an electronic processor for receiving and processing the image acquired by the imaging device in order to determine the width and the throat profile of the envelope, wherein the electronic processor computes preferred locations for placing each of the plurality of suction cups on the envelope in accordance with the width and the throat profile of the envelope; and 3) a positioning device for moving the plurality of suction cups to the preferred locations on the envelope based upon data indicative of the preferred locations received from the electronic processor.

2. The apparatus of claim 1, wherein the imaging device comprises a digital camera.

3. The apparatus of claim 1, wherein the imaging device comprises an image scanner.

4. The apparatus of claim 1, wherein the imaging device comprises at least one sensor array.

5. The apparatus of claim 1 further comprising a storage device for storing the envelope width and throat profile information.

6. The apparatus of claim 1, wherein the image device has an image plane, the apparatus further comprising an envelope supporting surface to support the envelope, wherein the envelope support surface comprises a plate to expose the throat section of the envelope toward the imaging device and wherein the plate is located at the image plane of the image device so as to allow the imaging device to acquire the image of the envelope.

7. The apparatus of claim 6, wherein the envelope supporting surface is movable in a scanning plane substantially parallel to the image plane of the imaging device, said apparatus further comprising a scanning device for moving the envelope supporting surface in the scanning plane while the imaging device acquires the image of the envelope.

8. The apparatus of claim 6, wherein the envelope has a first side edge and an opposing second side edge that define the width of the envelope, and the plate comprises a slot for aligning the first side edge of the envelope.

9. The apparatus of claim 8 further comprising an envelope width sensing device for sensing the width of the envelope, wherein said width sensing device sends the sensed information to the electronic processor for computing the width of the envelope.

10. The apparatus of claim 9, wherein the width measuring device comprises an array of optical sensors for detecting the second side edge of the envelope.

11. The apparatus of claim 6, wherein the imaging device is movable in a scanning plane substantially parallel to the envelope supporting surface.

12. The apparatus of claim 11 further comprising a scanning device for moving the imaging device in the scanning plane while the imaging device acquires the image of the envelope.

13. The apparatus of claim 12, wherein said scanning device comprises at least one translation stage.

14. In an envelope opening device for opening an envelope with a width and a throat section having a profile, wherein the opening device uses a plurality of suction cups to lift the throat section, a method for the automation of the envelope opening device comprising the steps of:

1) acquiring an image of the envelope with the imaging device;

2) conveying the acquired image to an electronic processor;

4) determining by the processor a width and a throat profile of the envelope using the acquired image;

5) computing the preferred locations for placing the plurality of suction cups in accordance with the width and the profile of the envelope; and 6) placing the suction cups at a plurality of locations on the envelope based on data indicative of the preferred locations computed in step 5.

15. The method of claim 14 further comprising the step of storing information regarding the preferred locations computed in step 5.

16. The method of claim 15 further comprising the step of calling out the stored information regarding the preferred locations.

17. A method of opening an envelope with a plurality of lifting devices placed on an envelope in order to spread open the envelope, wherein the envelope has a width and a throat section with a throat profile, said method comprising the steps of:

1) obtaining an image of the envelope, wherein the image contains information regarding the width and the throat profile of the envelope;

2) determining the preferred locations for placing each of the lifting devices on the throat section of the envelope in order to lift the throat section, wherein the determination of the preferred location is based on the information regarding the width and the throat profile;

3) conveying data containing the preferred locations to a positioning device;

4) placing the lifting devices on the envelope by the positioning device based on the conveyed data; and 5) lifting the throat section with the lifting devices so placed on the envelope.

* * * * *